US011985134B2

(12) United States Patent
Chauhan et al.

(10) Patent No.: US 11,985,134 B2
(45) Date of Patent: May 14, 2024

(54) ENHANCED AUTHENTICATION FRAMEWORK USING EPROM GRID PATTERN RECOGNITION

(71) Applicant: BANK OF AMERICA CORPORATION, Charlotte, NC (US)

(72) Inventors: Sandeep Kumar Chauhan, Miyapur Hyderabad (IN); Shailendra Singh, Maharashtra (IN); Santosh Kumar Miryala, PupalaGuda Manikonda (IN); Ramarao Gaddam, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 307 days.

(21) Appl. No.: 17/163,743

(22) Filed: Feb. 1, 2021

(65) Prior Publication Data
US 2022/0247751 A1 Aug. 4, 2022

(51) Int. Cl.
*H04L 9/40* (2022.01)
*G06F 18/22* (2023.01)
*G06V 20/80* (2022.01)

(52) U.S. Cl.
CPC ............ *H04L 63/102* (2013.01); *G06F 18/22* (2023.01); *G06V 20/80* (2022.01); *H04L 63/08* (2013.01)

(58) Field of Classification Search
CPC ......... H04L 63/102; H04L 63/08; H04L 9/32; H04L 63/12; G06F 18/22; G06F 21/31; G06V 20/80
See application file for complete search history.

(56) References Cited

U.S. PATENT DOCUMENTS 3,825,905 A 7/1974 Allen, Jr.
3,838,264 A 9/1974 Maker
(Continued)

OTHER PUBLICATIONS

Ryuji Kondo, "Test Patterns for EPROM's," IEEE Journal of solid-state circuits, vol. SC-14, No. Aug. 1979, pp. 730-734 (Year: 1979).*

(Continued)

*Primary Examiner* — Luu T Pham
*Assistant Examiner* — Canh Le
(74) *Attorney, Agent, or Firm* — Moore & Van Allen PLLC; Anup Shrinivasan Iyer (57) ABSTRACT

Systems, computer program products, and methods are described herein for implementing an enhanced authentication framework using Erasable Programmable Read-Only Memory (EPROM) grid pattern recognition. The present invention is configured to receive an indication of a resource transfer interaction initiated by a user using a resource transfer instrument at a resource transfer terminal, wherein the resource transfer instrument comprises an embedded EPROM grid, wherein the embedded EPROM grid is configurable to store a unique pattern associated with the user; retrieve, from the resource transfer terminal, the unique pattern from the embedded EPROM grid; determine that the unique pattern from the embedded EPROM grid matches one or more pre-registered unique patterns associated with the user; and authorize an execution of the resource transfer interaction by the user based on at least determining that the unique pattern from the embedded EPROM grid matches one or more pre-registered unique patterns associated with the user.

15 Claims, 3 Drawing Sheets

(56) References Cited

U.S. PATENT DOCUMENTS

| | | | |
|---|---|---|---|
| 4,193,131 A | 3/1980 | Lennon et al. | |
| 4,200,770 A | 4/1980 | Hellman et al. | |
| 4,218,582 A | 8/1980 | Hellman et al. | |
| 4,405,829 A | 9/1983 | Rivest et al. | |
| 4,458,315 A | 7/1984 | Jchenick | |
| 4,467,424 A | 8/1984 | Hedges et al. | |
| 4,494,114 A | 1/1985 | Kaish | |
| 4,519,077 A | 5/1985 | Amin | |
| 4,582,324 A | 4/1986 | Koza et al. | |
| 4,652,998 A | 3/1987 | Koza et al. | |
| 4,658,093 A | 4/1987 | Hellman | |
| 4,752,068 A | 6/1988 | Endo | |
| 4,759,064 A | 7/1988 | Chaum | |
| 4,817,140 A | 3/1989 | Chandra et al. | |
| 4,837,728 A | 6/1989 | Barrie et al. | |
| 4,845,715 A | 7/1989 | Francisco | |
| 4,856,787 A | 8/1989 | Itkis | |
| 4,879,689 A * | 11/1989 | Atsumi | G11C 16/225 365/185.04 |
| 4,911,449 A | 3/1990 | Dickinson et al. | |
| 4,926,255 A | 5/1990 | Von Kohorn | |
| 5,146,575 A | 9/1992 | Nolan, Jr. | |
| 5,155,680 A | 10/1992 | Wiedemer | |
| 5,274,778 A * | 12/1993 | Hall | G11C 16/10 365/201 |
| 5,280,447 A * | 1/1994 | Hazen | G11C 5/025 365/185.11 |
| 5,627,355 A * | 5/1997 | Rahman | G06Q 20/385 713/184 |
| 5,813,881 A * | 9/1998 | Nathan | H05K 1/0293 257/529 |
| 6,039,251 A * | 3/2000 | Holowko | G16H 10/65 235/375 |
| 6,154,872 A * | 11/2000 | Jones | G06F 11/08 714/E11.069 |
| 7,307,321 B1 * | 12/2007 | Avanzino | B82Y 10/00 257/379 |
| 2009/0206875 A1 * | 8/2009 | Tran | H03K 19/017581 326/82 |
| 2014/0006205 A1 * | 1/2014 | Berry | G06Q 30/04 705/26.7 |
| 2019/0050590 A1 * | 2/2019 | Alexander | H04L 9/3271 |

OTHER PUBLICATIONS

Chin Park et al., "A Radial Basic Function Neural Network with On-chip Learning," 1993, pp. 3035-3038 (Year: 1993).*

* cited by examiner

ENHANCED AUTHENTICATION FRAMEWORK USING EPROM GRID PATTERN RECOGNITION

FIELD OF THE INVENTION

The present invention embraces a system for implementing an enhanced authentication framework using Erasable Programmable Read-Only Memory (EPROM) grid pattern recognition.

BACKGROUND

With ubiquitous use of resource transfer instruments to initiate resource transfer interactions with entities, there is a need for an enhanced authentication framework capable of distinguishing a legitimate resource transfer instrument from a duplicate.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing an enhanced authentication framework using Erasable Programmable Read-Only Memory (EPROM) grid pattern recognition is presented. The system comprising: at least one non-transitory storage device; and at least one processing device coupled to the at least one non-transitory storage device, wherein the at least one processing device is configured to: electronically receive an indication of a resource transfer interaction initiated by a user using a resource transfer instrument at a resource transfer terminal, wherein the resource transfer instrument comprises an embedded EPROM grid, wherein the embedded EPROM grid is configurable to form a unique pattern associated with the user; electronically retrieve, from the resource transfer terminal, the unique pattern from the embedded EPROM grid; determine that the unique pattern from the embedded EPROM grid matches one or more pre-registered unique patterns associated with the user; and authorize an execution of the resource transfer interaction by the user based on at least determining that the unique pattern from the embedded EPROM grid matches one or more pre-registered unique patterns associated with the user.

In some embodiments, the at least one processing device is further configured to: generate the one or more pre-registered unique patterns associated with the user, wherein generating further comprises: generating a digital emulation of the embedded EPROM grid associated with the resource transfer instrument, wherein the digital emulation of the embedded EPROM grid comprises one or more selectable grids; transmitting, via a computing device of the user, the digital emulation of the embedded EPROM grid; electronically receiving, via the computing device of the user, a user selection of one or more combinations of the one or more selectable grids from the digital emulation of the embedded EPROM grid; generating the one or more pre-registered unique patterns based on at least the user selection of the one or more combinations of the one or more selectable grids; and storing the one or more pre-registered unique patterns in a grid pattern repository.

In some embodiments, the at least one processing device is further configured to generate the one or more pre-registered unique patterns associated with the user, wherein generating further comprises: capturing, using the computing device of the user, an interaction of the user with the embedded EPROM grid, wherein the interaction comprises the user selection of the one or more combinations of the one or more selectable grids of the embedded EPROM grid; generating the one or more pre-registered unique patterns based on at least capturing the interaction of the user with the embedded EPROM grid; and storing the one or more pre-registered unique patterns in the grid pattern repository.

In some embodiments, the at least one processing device is further configured to: generate the one or more pre-registered unique patterns associated with the user, wherein generating further comprises: electronically receiving, via the computing device of the user, a request to generate the one or more pre-registered unique patterns; automatically generating the one or more pre-registered unique patterns in response to receiving the request; and storing the one or more pre-registered unique patterns in the grid pattern repository.

In some embodiments, the at least one processing device is further configured to determine that the unique pattern from the embedded EPROM grid matches one or more pre-registered unique patterns associated with the user, wherein determining further comprises: comparing the unique pattern from the embedded EPROM grid with the one or more pre-registered unique patterns associated with the user; and determining a match between the unique pattern from the embedded EPROM grid and at least one of the one or more pre-registered unique patterns associated with the user.

In some embodiments, the at least one processing device is further configured to: determine that the unique pattern from the embedded EPROM grid does not match the one or more pre-registered unique patterns associated with the user; deny the resource transfer interaction by the user based on at least determining that the unique pattern from the embedded EPROM grid does not match the one or more pre-registered unique patterns associated with the user; and transmit a notification to the computing device of the user, wherein the notification comprises an indication that the resource transfer interaction initiated by the user is denied.

In some embodiments, the at least one processing device is further configured to: electronically receive one or more authentication credentials from the user in response to determining that the that the unique pattern from the embedded EPROM grid matches one or more pre-registered unique patterns associated with the user; validate the one or more authentication credentials to verify an identity of the user based on at least receiving the one or more authentication credentials; and authorize an execution of the resource transfer interaction by the user based on at least (i) validating the one or more authentication credentials, and (ii) determining that the unique pattern from the embedded EPROM grid matches one or more pre-registered unique patterns associated with the user.

In some embodiments, the at least one processing device is further configured to: electronically retrieve, from the resource transfer terminal, the unique pattern from an embedded chip interface of the resource transfer instrument, wherein the unique pattern from the embedded EPROM grid is stored in the embedded chip interface.

In another aspect, a computer program product for implementing an enhanced authentication framework using Erasable Programmable Read-Only Memory (EPROM) grid pattern recognition is presented. The computer program product comprising a non-transitory computer-readable medium comprising code causing a first apparatus to: electronically receive an indication of a resource transfer interaction initiated by a user using a resource transfer instrument at a resource transfer terminal, wherein the resource transfer instrument comprises an embedded EPROM grid, wherein the embedded EPROM grid is configurable to form a unique pattern associated with the user; electronically retrieve, from the resource transfer terminal, the unique pattern from the embedded EPROM grid; determine that the unique pattern from the embedded EPROM grid matches one or more pre-registered unique patterns associated with the user; and authorize an execution of the resource transfer interaction by the user based on at least determining that the unique pattern from the embedded EPROM grid matches one or more pre-registered unique patterns associated with the user.

In yet another aspect, a method for implementing an enhanced authentication framework using Erasable Programmable Read-Only Memory (EPROM) grid pattern recognition is presented. The method comprising: electronically receiving an indication of a resource transfer interaction initiated by a user using a resource transfer instrument at a resource transfer terminal, wherein the resource transfer instrument comprises an embedded EPROM grid, wherein the embedded EPROM grid is configurable to form a unique pattern associated with the user; electronically retrieving, from the resource transfer terminal, the unique pattern from the embedded EPROM grid; determining that the unique pattern from the embedded EPROM grid matches one or more pre-registered unique patterns associated with the user; and authorizing an execution of the resource transfer interaction by the user based on at least determining that the unique pattern from the embedded EPROM grid matches one or more pre-registered unique patterns associated with the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/ rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "resource transfer instrument" may refer to an electronic payment vehicle, such as an electronic credit or debit card. The resource transfer may not be a "card" at all and may instead be account identifying information stored electronically in a user device, such as payment credentials or tokens/aliases associated with a digital wallet, or account identifiers stored by a mobile application. For purposes of the invention, the resource transfer instrument may be a biometric financial instrument that is a combination of a fingerprint scanner/touch sensor and applicable payment technology.

Figure 1:
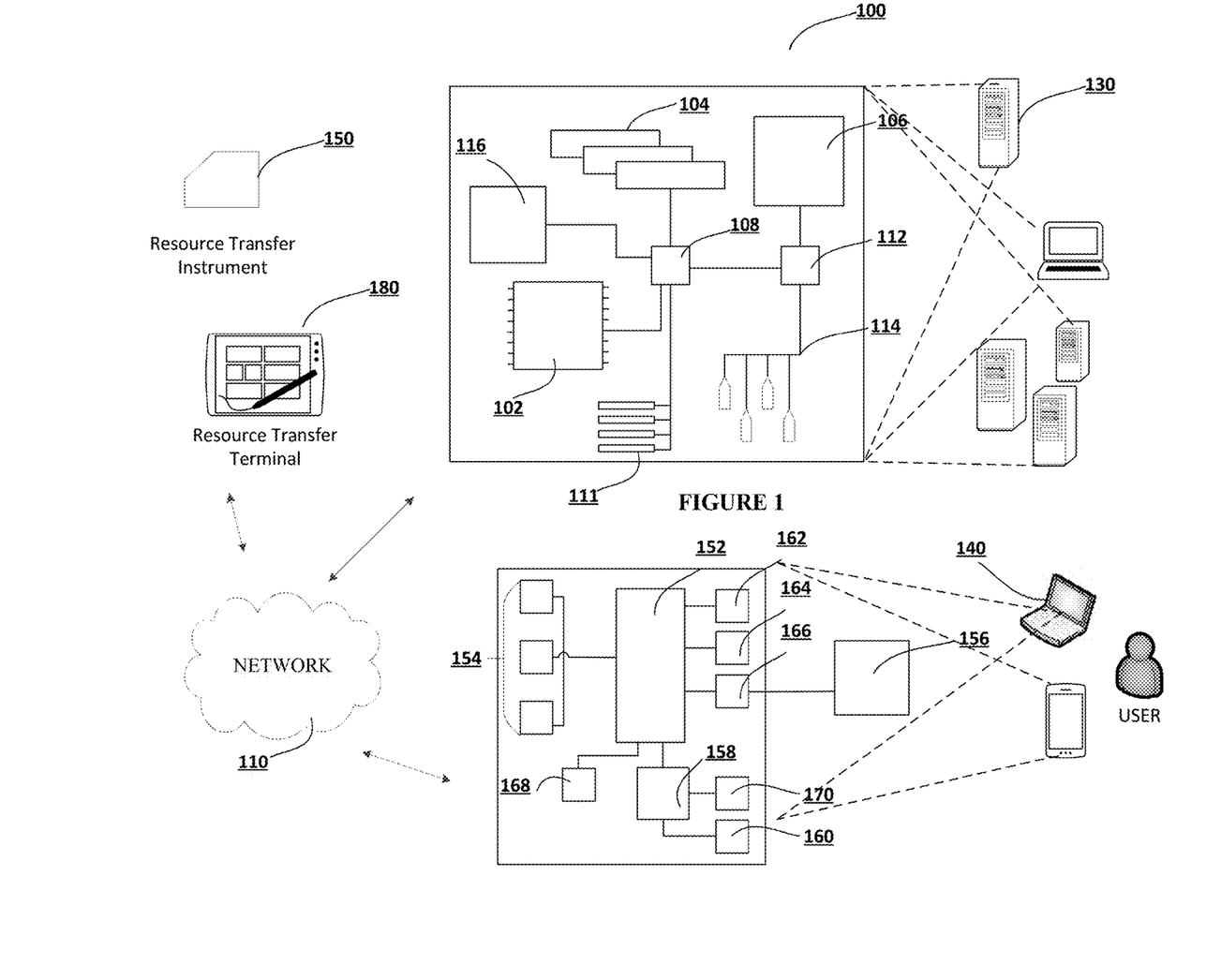
FIG. 1 illustrates technical components of a system for implementing an enhanced authentication framework using Erasable Programmable Read-Only Memory (EPROM) grid pattern recognition, in accordance with an embodiment of the invention.

FIG. 1 presents an exemplary block diagram of the system environment for implementing an enhanced authentication framework using Erasable Programmable Read-Only Memory (EPROM) grid pattern recognition 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, a user input system 140, a resource transfer instrument 150, and a resource transfer terminal 180. Also shown in FIG. 1 is a user of the user input system 140. The user input system 140 may be a mobile device or other non-mobile computing device. The user may be a person who uses the user input system 140 and/or the resource transfer instrument 150 in communication with the resource transfer terminal 180 to execute resource transfers using one or more applications stored thereon. The one or more applications stored on the user input system 140 may be configured to communicate with the system 130, execute a transaction, input information onto a user interface presented on the user input system 140, or the like. The applications stored on the user input system 140, the resource transfer terminal 180, and the system 130 may incorporate one or more parts of any process flow described herein.

As shown in FIG. 1, the system 130, the resource transfer terminal 180, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130, the resource transfer terminal 180, and the user input system 140 may be used to implement the processes described herein, including the mobile-side, resource transfer side, and server-side processes for installing a computer program from a mobile device to a computer, in accordance with an embodiment of the present invention. The system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 and the resource transfer terminal 180. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

FIG. 1 also illustrates a resource transfer terminal 180, in accordance with an embodiment of the invention. Similar to the system 130 and the user input system 140, the resource transfer terminal 180 includes a dedicated processor, memory, an input/output device such as a display, a communication interface, and a transceiver, among other components. The resource transfer terminal 180 may also be provided with a storage device, such as a microdrive or other device, to provide additional storage. Each of these components are interconnected using various buses, and several of the components may be mounted on a common motherboard or in other manners as appropriate.

FIG. 1 also illustrates a resource transfer instrument 150, in accordance with an embodiment of the invention. A resource transfer instrument 150 may be capable of initiating (and executing) resource transfer interactions with the resource transfer terminal 180. In some embodiments, the resource transfer instrument 150 may include an Erasable Programmable Read-Only Memory (EPROM) grid embedded thereon capable of being configured to implement an enhanced authentication requirement when executing resource transfer interactions. In one aspect, the resource transfer instrument 150 may be equipped with embedded digital signal processing circuitry where necessary to communicate with the resource transfer terminal 180 and may include application-specific-integrated circuitry (ASIC) capable of executing the resource transfer interactions with the resource transfer terminal 180. In this regard, the resource transfer instrument 150 may include one or more scanning devices embedded/built-in within the composition of the resource transfer instrument 150 capable of reading the embedded EPROM grid on the resource transfer instrument 150. Such scanning devices may be configured to receive a unique pattern from the embedded EPROM grid associated with the resource transfer instrument 150 and transmit the unique pattern to the system 130. In some embodiments, the resource transfer terminal 150 may include an embedded chip interface in addition to the embedded EPROM grid. In one aspect, the embedded chip interface may be configured to read the patterns programmed into the embedded EPROM grid and transmit the patterns to the resource transfer terminal 180 using either a contact-based or contactless (near-field) communication. The resource transfer terminal 180 may then be configured to transmit any pattern received from the resource transfer instrument 150 (via the embedded chip interface) to the system 130 for authentication purposes.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Figure 2:
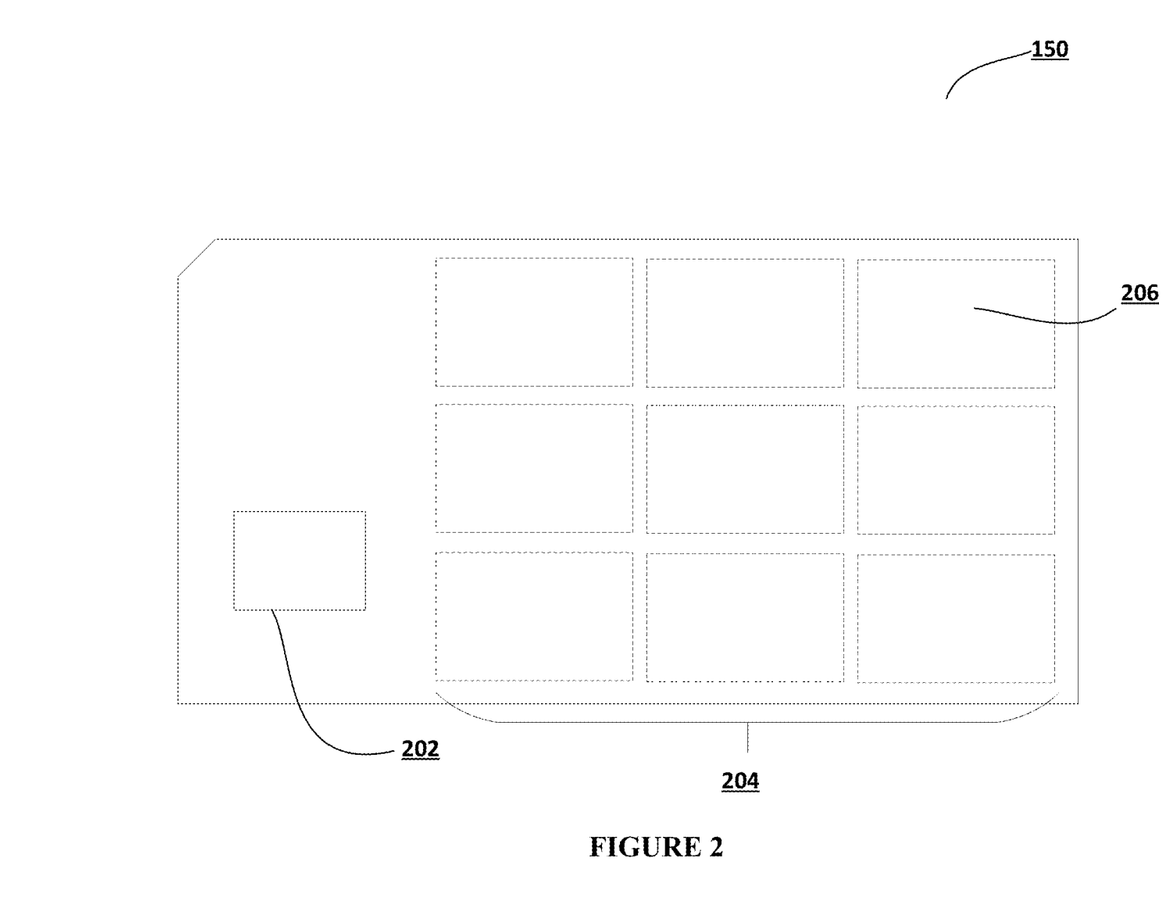
FIG. 2 illustrates an exemplary resource transfer instrument with Erasable Programmable Read-Only Memory (EPROM) grid pattern, in accordance with an embodiment of the invention.

FIG. 2 illustrates an exemplary resource transfer instrument with Erasable Programmable Read-Only Memory (EPROM) grid pattern 200, in accordance with an embodiment of the invention. As described herein, the resource transfer instrument 150 may be embedded with an integrated circuit that can be a secure microcontroller or equivalent intelligence powered by an onboard power source (such as a photovoltaic cell or solar cell) and having an internal memory or a memory chip. In one aspect, the resource transfer instrument 150 communicates with a resource transfer terminal with direct physical contact or with a remote contactless radio frequency (or equivalent short range communication) interface. With an embedded microcontroller, the resource transfer instrument 150 has the unique ability to store information, carry out its own onboard functions (e.g., encryption and mutual authentication) and/or interact intelligently with a resource transfer terminal.

As shown in FIG. 2, the resource transfer instrument 150 includes an embedded programmable EPROM grid 204 having a number of selectable grids (finite points) 206. It is to be understood that FIG. 2 shows an exemplary resource transfer instrument 150 with 9 selectable grids but any number of programmable grids may be embedded in the resource transfer instrument. In addition to the EPROM grid 204, the resource transfer terminal 150 includes an embedded chip interface 202. In some embodiments, the embedded chip interface 202 may be an integrated circuit that capable of being used as a physical electronic authorization device to control access to a resource. Each time the resource transfer instrument 150 is used to execute a transfer of resources at a resource transfer terminal, the embedded chip interface 202 is accessed by the resource transfer terminal and provides an additional layer of security.

Figure 3:
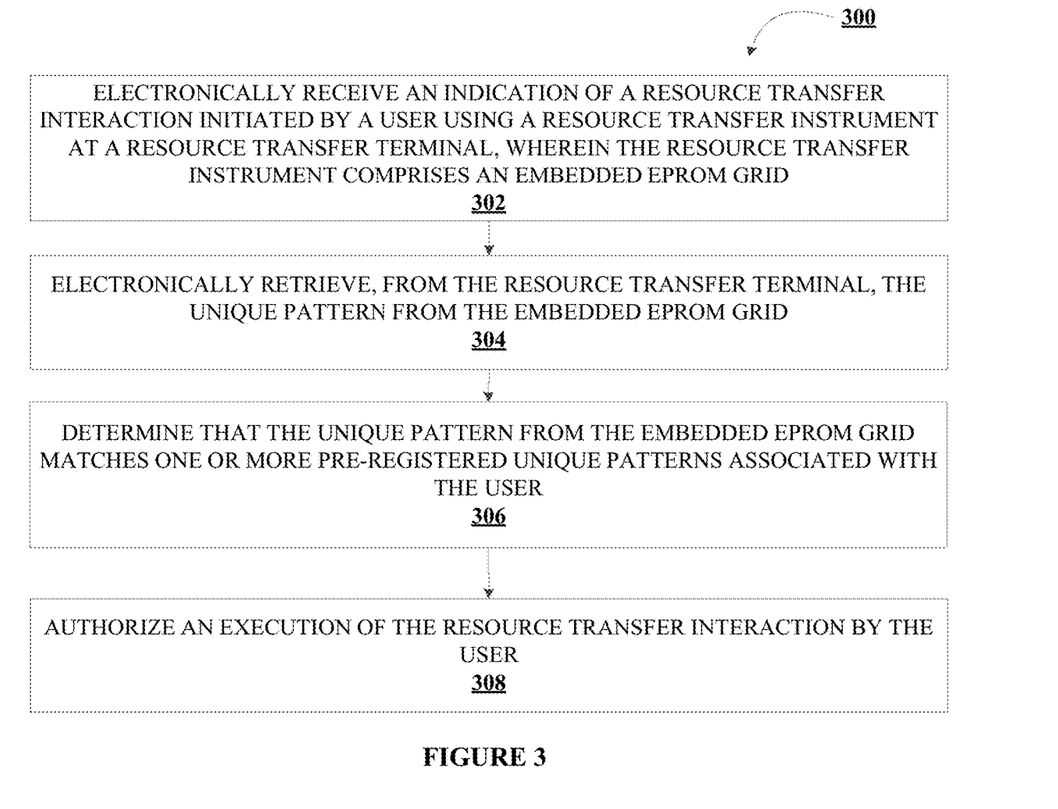
FIG. 3 illustrates a process flow for implementing an enhanced authentication framework using Erasable Programmable Read-Only Memory (EPROM) grid pattern recognition, in accordance with an embodiment of the invention.

FIG. 3 illustrates a process flow for implementing an enhanced authentication framework using Erasable Programmable Read-Only Memory (EPROM) grid pattern recognition 300, in accordance with an embodiment of the invention. As shown in block 302, the process flow includes electronically receiving an indication of a resource transfer interaction initiated by a user using a resource transfer instrument at a resource transfer terminal, wherein the resource transfer instrument comprises an embedded EPROM grid. In some embodiments, the embedded EPROM grid may be configurable to form a unique pattern associated with the user. In one aspect, the embedded EPROM grid may be programmed in such a way that a specific portion of the grid, i.e., a collection of finite points on the EPROM grid is configured to actively store information while the rest of the grid remains passive. In doing so, the embedded EPROM grid may be configured to form a pattern comprising a portion of finite points that are programmed with information and a remaining portion of finite points that are remain passive. In another aspect, the embedded EPROM grid may be programmed in such a way that a specific portion of the grid, i.e., a collection of finite points on the EPROM grid, is configured to actively store a first information (e.g., 1s) while the remaining portion of the grid is configured to store a second information (e.g., 0). In yet another aspect, the embedded EPROM grid may be programmed in such a way that a first portion of the grid, i.e., a first collection of finite points on the EPROM grid, is configured to actively store a first information (e.g., 1s), a second portion of the grid is configured to actively store a second information (e.g., 0), and a remaining portion of the grid is configured to remain passive.

Next, as shown in block 304, the process flow includes electronically retrieving, from the resource transfer terminal, the unique pattern from the embedded EPROM grid. As described herein, when the resource transfer instrument interacts with the resource transfer terminal the scanning devices associated with the resource transfer instrument may be capable of reading the embedded EPROM grid on the resource transfer instrument. By reading the embedded EPROM grid, the resource transfer instrument may be able to identify the unique pattern programmed on embedded EPROM grid. Once the unique pattern is identified, the system may be configured to retrieve the unique pattern from the resource transfer terminal.

Next, as shown in block 306, the process flow includes determining that the unique pattern from the embedded EPROM grid matches one or more pre-registered unique patterns associated with the user. In some embodiments, the pre-registered unique patterns are previously generated for the user and stored in a grid pattern repository. Each user may generate or be associated with a number of unique patterns that may be pre-registered.

In one aspect, the system may be configured generate the pre-registered unique patterns by allowing the user to select a combination of selectable grids (finite points) by digitally emulating the resource transfer instrument. In this regard, the system may be configured to generating a digital emulation of the embedded EPROM grid associated with the resource transfer instrument. The digital emulation of the embedded EPROM grid may include a number of grids that are capable of being selected by the user. Once generated, the system may be configured to transmit, via a computing device of the user, the digital emulation of the embedded EPROM grid. In this regard, the system may be configured to initiate a display of a user interface on the computing device of the user via a mobile application. In response, the system may be configured to electronically receive, via the computing device of the user, a user selection of one or more combinations of the one or more selectable grids from the digital emulation of the embedded EPROM grid. In response to receiving the user selection, the system may be configured to generate the one or more pre-registered unique patterns by programming the grids (finite points) selected by the user to form a pattern. In response to generating the pre-registered unique patterns, the system may be configured to store the one or more pre-registered unique patterns in a grid pattern repository.

In another aspect, the system may be configured to generate the pre-registered unique patterns by capturing the interaction of the user with the embedded EPROM grid on the resource transfer instrument via the computing device of the user. In this regard, the system may be configured to capture, using the computing device of the user, the user selection of the one or more combinations of the one or more selectable grids of the embedded EPROM grid. To achieve this, the computing device of the user and the resource transfer instrument may be communicably link in such a way that the computing device of the user is capable of receiving information from the resource transfer instrument. Each time the user selects a grid (finite point), the computing device of the user receives the user's selection either in real-time or near real-time. In response to capturing the interaction of the user with the embedded EPROM grid, the system may be configured to generate the one or more pre-registered unique patterns. In response to generating the pre-registered unique patterns, the system may be configured to store the one or more pre-registered unique patterns in a grid pattern repository.

In yet another aspect, the system may be configured to generate the pre-registered unique patterns automatically. In this regard, the system may be configured to electronically receive, via the computing device of the user, a request to generate the one or more pre-registered unique patterns. In response, the system may be configured to automatically generate the one or more pre-registered unique patterns in response to receiving the request. In response to generating the pre-registered unique patterns, the system may be configured to store the one or more pre-registered unique patterns in a grid pattern repository.

In some embodiments, the resource transfer instrument may be configured to store the unique pattern in the embedded chip interface. In addition to programming the pattern on the resource transfer instrument, the pattern may also be stored in the embedded chip interface. In this way, resource transfer terminals that are not equipped with scanning devices capable of scanning the embedded EPROM grid for the unique pattern are still able to retrieve the unique pattern from the resource transfer instrument via the embedded chip interface.

In some embodiments, in response to generating the pre-registered unique patterns, the system may be configured to program the pre-registered unique patterns on resource transfer instruments. In this regard, the system may be configured to electronically receive, from the computing device of the user, a user input linking the one or more pre-registered unique patterns with one or more resource transfer instruments associated with the user. In some response, the system may be configured to link the one or more pre-registered unique patterns with one or more resource transfer instruments associated with the user. In this regard, the system may be configured to program the embedded EPROM grids on each of the one or more resource transfer instruments to reflect the one or more pre-registered unique patterns.

In some embodiments, by generating multiple pre-registered unique patterns, the user may assign each pre-registered unique pattern a specific purpose or interaction limit. Accordingly, the system may be configured to electronically receive, from the computing device of the user, one or more interaction limits associated with the pre-registered pattern. For example, an interaction limit may include limiting the use of a pre-registered pattern to a specific type of resource transfer interaction, limiting the use of a pre-registered pattern to a specific geographic vicinity, allowing the pre-registered pattern to be used by a specific sub-user as authorized by the user, and/or the like. In response to receiving the interaction limits, the system may be configured to link each pre-registered unique pattern with one or more interaction limits. In this way, when the pre-registered unique pattern is programmed into the embedded EPROM grid on the resource transfer instrument, its use is limited by the interaction limit associated with the pre-registered unique pattern.

Next, as shown in block 306, the process flow includes determining that the unique pattern from the embedded EPROM grid matches one or more pre-registered unique patterns associated with the user. In this regard, the system may be configured to compare the unique pattern from the embedded EPROM grid with the one or more pre-registered unique patterns associated with the user. Based on the comparing, the system may be configured to determine a match between the unique pattern from the embedded EPROM grid and at least one of the one or more pre-registered unique patterns associated with the user.

Next, as shown in block 308, the process flow includes authorizing an execution of the resource transfer interaction by the user based on at least determining that the unique pattern from the embedded EPROM grid matches one or more pre-registered unique patterns associated with the user. In some embodiments, before authorizing the resource transfer interaction, the system may be configured to require from the user, authentication credentials in addition to determining that the unique pattern from the embedded EPROM grid matches one or more pre-registered unique patterns associated with the user. Accordingly, the system may be configured to electronically receive one or more authentication credentials from the user in response to determining that the that the unique pattern from the embedded EPROM grid matches one or more pre-registered unique patterns associated with the user. In response, the system may be configured to validate the one or more authentication credentials to verify an identity of the user based on at least receiving the one or more authentication credentials. In response, the system may be configured to authorize an execution of the resource transfer interaction by the user based on at least (i) validating the one or more authentication credentials, and (ii) determining that the unique pattern from the embedded EPROM grid matches one or more pre-registered unique patterns associated with the user.

In some embodiments, the system may be configured to determine that the unique pattern from the embedded EPROM grid does not match the one or more pre-registered unique patterns associated with the user. In response, the system may be configured to deny the resource transfer interaction by the user based on at least determining that the unique pattern from the embedded EPROM grid does not match the one or more pre-registered unique patterns associated with the user. In response, the system may be configured to transmit a notification to the computing device of the user, wherein the notification comprises an indication that the resource transfer interaction initiated by the user is denied. In some embodiments, in addition to transmitting the notification to the computing device of the user, the system may be configured to initiate a notification to the user via one or more display devices associated with the resource transfer terminal.

In some embodiments, the system may be configured to implement a tiered pattern mapping on the resource transfer instrument. In one aspect, each tier may be established based an exposure level associated with the resource transfer interaction. Resource transfer interactions with a higher exposure level may be mapped to a higher tier while resource transfer interactions with a lower exposure level may be mapped to a lower tier. As part of the tiered pattern mapping, the resource transfer instrument may be programmed to store a unique pattern for each tier. When the user initiates a resource transfer interaction at a resource transfer terminal, the system may be configured to determine a tier associated with the resource transfer interaction. In response to determining the tier, the system may be configured to retrieve the unique pattern associated with the resource transfer instrument based on the determined tier.

In some embodiments, the system may be configured to elevate the tier of the resource transfer interaction based on a geographic vicinity. In one example, the system may be configured to determine that a geographic vicinity (or the specific resource transfer terminal) where the user has requested to execute the resource transfer interaction has previously been the target for misappropriate activity. In response, the system may be configured to classify the resource transfer interaction to a higher tier.

In one aspect, the system may be configured to determine the geographic vicinity of the resource transfer interaction after the user has initiated the resource transfer interaction. In such cases, the system may be configured to receive geographic information from the resource transfer terminal once the user has inserted the resource transfer instrument into the resource transfer terminal to initiate an execution of the resource transfer interaction. In response, the system may be configured to transmit a notification to the computing device of the user indicating that the resource transfer interaction is classified to a higher tier based on the geographic vicinity of the resource transfer terminal. This notification automatically triggers a communication between the computing device of the user and the resource transfer instrument. Now, when the resource transfer instrument is used to execute the resource transfer interaction, the unique pattern presented to the resource transfer terminal may be the pattern that is associated with the higher tier.

In another aspect, the system may be configured to determine the geographic vicinity of the resource transfer interaction before the user has initiated the resource transfer interaction. In this regard, when the user approaches a resource transfer terminal, the computing device of the user may determine the geographic vicinity of the user (using GPS coordinates) and determine that any resource transfer interactions executed in the geographic vicinity may need to be classified into an elevated tier. In determining the geographic vicinity, a communication between the computing device of the user and the resource transfer instrument is automatically triggered that indicates to the resource transfer instrument that when the resource transfer instrument is used to execute a resource transfer interaction with any resource transfer terminal in the geographic vicinity, it must use the unique pattern associated with an elevated tier.

In some embodiments, in response to receiving a unique pattern from an elevated tier, the system may be configured to initiate an authentication protocol that is specific to that tier before authorizing the execution of the resource transfer interaction. In one aspect, the authentication protocol specific to the elevated tier may require additional authentication credentials from the user in addition to the resource transfer instrument.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing an enhanced authentication framework using Erasable Programmable Read-Only Memory (EPROM) grid pattern recognition, the system comprising:
    at least one non-transitory storage device; and
    at least one processing device coupled to the at least one non-transitory storage device, wherein the at least one processing device is configured to:
        receive, from a computing device of a user, a request to generate one or more grid patterns for a resource transfer instrument associated with the user, wherein the resource transfer instrument comprises an embedded EPROM grid embedded thereon, wherein the embedded EPROM grid comprises a plurality of selectable grid elements, wherein the plurality of selectable grid elements comprises active grid elements and passive grid elements;
        generate a digital emulation of the embedded EPROM grid associated with the resource transfer instrument in response to receiving the request, wherein the digital emulation of the embedded EPROM grid comprises one or more selectable grids;
        display the one or more selectable grids on the computing device of the user for user selection;
        receive, from the computing device of the user, the user selection of one or more combinations of the one or more selectable grids;
        generate the one or more grid patterns based on each of the one or more combinations;
        program the resource transfer instrument to store the one or more grid patterns in the embedded EPROM grid wherein a first portion of the active grid elements are configured to store a first information associated with each grid pattern and a second portion of the active grid elements are configured to store a second information associated with each grid pattern, wherein the first information comprises 1's and the second information comprises 0's, wherein each grid pattern is programmed as a combination of the first portion of the active grid elements, the second portion of the active grid elements, and the passive grid elements;
        store the one or more grid patterns in a grid pattern repository;
        electronically receive, from a resource transfer terminal, an indication of a resource transfer interaction initiated by the user using the resource transfer instrument, wherein the resource transfer interaction is associated with an exposure level, wherein the exposure level represents a measure of exposure or sensitivity of the resource transfer interaction, categorizing it into different tiers, each having a unique security pattern for authentication;
        capture, via the resource transfer terminal, the one more grid patterns from the EPROM grid of the resource transfer instrument;
        determine that at least one grid pattern matches a grid pattern associated with the exposure level of the resource transfer interaction; and
        authorize an execution of the resource transfer interaction by the user based on at least determining that the at least one grid pattern matches the grid pattern associated with the exposure level of the resource transfer interaction.

2. The system of claim 1, wherein the at least one processing device is further configured to determine that the one or more grid patterns from the EPROM grid of the resource transfer instrument matches the grid pattern associated with the exposure level of the resource transfer interaction, wherein determining further comprises:
    comparing the one or more grid patterns from the EPROM grid of the resource transfer instrument with the grid pattern associated with the exposure level of the resource transfer interaction; and
    determining a match between at least one of the one or more grid patterns from the embedded EPROM grid of the resource transfer instrument and the grid pattern associated with the exposure level of the resource transfer interaction.

3. The system of claim 2, wherein the at least one processing device is further configured to:
- determine that the one or more grid patterns from the EPROM grid of the resource transfer instrument does not match the grid pattern associated with the exposure level of the resource transfer interaction;
- deny the resource transfer interaction by the user based on at least determining that the one or more grid patterns from the EPROM grid of the resource transfer instrument does not match the grid pattern associated with the exposure level of the resource transfer interaction; and
- transmit a notification to the computing device of the user, wherein the notification comprises an indication that the resource transfer interaction initiated by the user is denied.

4. The system of claim 3, wherein the at least one processing device is further configured to:
- electronically receive one or more authentication credentials from the user in response to determining that the that the one or more grid patterns from the EPROM grid of the resource transfer instrument does not match the grid pattern associated with the exposure level of the resource transfer interaction;
- validate the one or more authentication credentials to verify an identity of the user based on at least receiving the one or more authentication credentials; and
- authorize an execution of the resource transfer interaction by the user based on at least (i) validating the one or more authentication credentials.

5. The system of claim 1, wherein the at least one processing device is further configured to:
- electronically retrieve, from the resource transfer terminal, the one or more grid patterns from an embedded chip interface of the resource transfer instrument, wherein the one or more grid patterns from the embedded EPROM grid is stored in the embedded chip interface.

6. A computer program product for implementing an enhanced authentication framework using Erasable Programmable Read-Only Memory (EPROM) grid pattern recognition, the computer program product comprising a non-transitory computer-readable medium comprising code causing a first apparatus to:
- receive, from a computing device of a user, a request to generate one or more grid patterns for a resource transfer instrument associated with the user, wherein the resource transfer instrument comprises an embedded EPROM grid embedded thereon, wherein the embedded EPROM grid comprises a plurality of selectable grid elements, wherein the plurality of selectable grid elements comprises active grid elements and passive grid elements;
- generate a digital emulation of the embedded EPROM grid associated with the resource transfer instrument in response to receiving the request, wherein the digital emulation of the embedded EPROM grid comprises one or more selectable grids;
- display the one or more selectable grids on the computing device of the user for user selection;
- receive, from the computing device of the user, the user selection of one or more combinations of the one or more selectable grids;
- generate the one or more grid patterns based on each of the one or more combinations;
- program the resource transfer instrument to store the one or more grid patterns in the embedded EPROM grid wherein a first portion of the active grid elements are configured to store a first information associated with each grid pattern and a second portion of the active grid elements are configured to store a second information associated with each grid pattern, wherein the first information comprises 1's and the second information comprises 0's, wherein each grid pattern is programmed as a combination of the first portion of the active grid elements, the second portion of the active grid elements, and the passive grid elements;
- store the one or more grid patterns in a grid pattern repository;
- electronically receive, from a resource transfer terminal, an indication of a resource transfer interaction initiated by the user using the resource transfer instrument, wherein the resource transfer interaction is associated with an exposure level, wherein the exposure level represents a measure of exposure or sensitivity of the resource transfer interaction, categorizing it into different tiers, each having a unique security pattern for authentication;
- capture, via the resource transfer terminal, the one more grid patterns from the EPROM grid of the resource transfer instrument;
- determine that at least one grid pattern matches a grid pattern associated with the exposure level of the resource transfer interaction; and
- authorize an execution of the resource transfer interaction by the user based on at least determining that the at least one grid pattern matches the grid pattern associated with the exposure level of the resource transfer interaction.

7. The computer program product of claim 6, wherein the non-transitory computer-readable medium comprising code causes the first apparatus to determine that the one or more grid patterns from the EPROM grid of the resource transfer instrument matches the grid pattern associated with the exposure level of the resource transfer interaction, wherein determining further comprises:
- comparing the one or more grid patterns from the EPROM grid of the resource transfer instrument with the grid pattern associated with the exposure level of the resource transfer interaction; and
- determining a match between at least one of the one or more grid patterns from the embedded EPROM grid of the resource transfer instrument and the grid pattern associated with the exposure level of the resource transfer interaction.

8. The computer program product of claim 7, wherein the non-transitory computer-readable medium comprising code causes the first apparatus to:
- determine that the one or more grid patterns from the EPROM grid of the resource transfer instrument does not match the grid pattern associated with the exposure level of the resource transfer interaction;
- deny the resource transfer interaction by the user based on at least determining that the one or more grid patterns from the EPROM grid of the resource transfer instrument does not match the grid pattern associated with the exposure level of the resource transfer interaction; and
- transmit a notification to the computing device of the user, wherein the notification comprises an indication that the resource transfer interaction initiated by the user is denied.

9. The computer program product of claim 8, wherein the non-transitory computer-readable medium comprising code causes the first apparatus to:
- electronically receive one or more authentication credentials from the user in response to determining that the that the one or more grid patterns from the EPROM grid of the resource transfer instrument does not match the grid pattern associated with the exposure level of the resource transfer interaction;
- validate the one or more authentication credentials to verify an identity of the user based on at least receiving the one or more authentication credentials; and
- authorize an execution of the resource transfer interaction by the user based on at least (i) validating the one or more authentication credentials.

10. The computer program product of claim 6, wherein the non-transitory computer-readable medium comprising code causes the first apparatus to:
- electronically retrieve, from the resource transfer terminal, the one or more grid patterns from an embedded chip interface of the resource transfer instrument, wherein the one or more grid patterns from the embedded EPROM grid is stored in the embedded chip interface.

11. A method for implementing an enhanced authentication framework using Erasable Programmable Read-Only Memory (EPROM) grid pattern recognition, the method comprising:
- receiving, from a computing device of a user, a request to generate one or more grid patterns for a resource transfer instrument associated with the user, wherein the resource transfer instrument comprises an embedded EPROM grid embedded thereon, wherein the embedded EPROM grid comprises a plurality of selectable grid elements, wherein the plurality of selectable grid elements comprises active grid elements and passive grid elements;
- generating a digital emulation of the embedded EPROM grid associated with the resource transfer instrument in response to receiving the request, wherein the digital emulation of the embedded EPROM grid comprises one or more selectable grids;
- displaying the one or more selectable grids on the computing device of the user for user selection;
- receiving, from the computing device of the user, the user selection of one or more combinations of the one or more selectable grids;
- generating the one or more grid patterns based on each of the one or more combinations;
- programming the resource transfer instrument to store the one or more grid patterns in the embedded EPROM grid wherein a first portion of the active grid elements are configured to store a first information associated with each grid pattern and a second portion of the active grid elements are configured to store a second information associated with each grid pattern, wherein the first information comprises 1's and the second information comprises 0's, wherein each grid pattern is programmed as a combination of the first portion of the active grid elements, the second portion of the active grid elements, and the passive grid elements;
- storing the one or more grid patterns in a grid pattern repository;
- electronically receiving, from a resource transfer terminal, an indication of a resource transfer interaction initiated by the user using the resource transfer instrument, wherein the resource transfer interaction is associated with an exposure level, wherein the exposure level represents a measure of exposure or sensitivity of the resource transfer interaction, categorizing it into different tiers, each having a unique security pattern for authentication;
- capturing, via the resource transfer terminal, the one more grid patterns from the EPROM grid of the resource transfer instrument;
- determining that at least one grid pattern matches a grid pattern associated with the exposure level of the resource transfer interaction; and
- authorizing an execution of the resource transfer interaction by the user based on at least determining that the at least one grid pattern matches the grid pattern associated with the exposure level of the resource transfer interaction.

12. The method of claim 11, wherein determining that the one or more grid patterns from the EPROM grid of the resource transfer instrument matches the grid pattern associated with the exposure level of the resource transfer interaction further comprises:
- comparing the one or more grid patterns from the EPROM grid of the resource transfer instrument with the grid pattern associated with the exposure level of the resource transfer interaction; and
- determining a match between at least one of the one or more grid patterns from the embedded EPROM grid of the resource transfer instrument and the grid pattern associated with the exposure level of the resource transfer interaction.

13. The method of claim 12, wherein the method further comprising:
- determining that the one or more grid patterns from the EPROM grid of the resource transfer instrument does not match the grid pattern associated with the exposure level of the resource transfer interaction;
- denying the resource transfer interaction by the user based on at least determining that the one or more grid patterns from the EPROM grid of the resource transfer instrument does not match the grid pattern associated with the exposure level of the resource transfer interaction; and
- transmitting a notification to the computing device of the user, wherein the notification comprises an indication that the resource transfer interaction initiated by the user is denied.

14. The method of claim 13, wherein the method further comprising:
- electronically receiving one or more authentication credentials from the user in response to determining that the that the one or more grid patterns from the EPROM grid of the resource transfer instrument does not match the grid pattern associated with the exposure level of the resource transfer;
- validating the one or more authentication credentials to verify an identity of the user based on at least receiving the one or more authentication credentials; and
- authorizing an execution of the resource transfer interaction by the user based on at least (i) validating the one or more authentication credentials.

15. The method of claim 11, wherein the method further comprising:
- electronically retrieving, from the resource transfer terminal, the one or more grid patterns from an embedded chip interface of the resource transfer instrument, wherein the one or more grid patterns from the embedded EPROM grid is stored in the embedded chip interface.

\* \* \* \* \*